United States Patent
Kawasaki

(10) Patent No.: US 8,825,041 B2
(45) Date of Patent: Sep. 2, 2014

(54) RELAY DEVICE, RELAY DEVICE CONTROL METHOD, AND RADIO COMMUNICATION SYSTEM

(75) Inventor: Yoshihiro Kawasaki, Yokosuka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/608,616

(22) Filed: Sep. 10, 2012

(65) Prior Publication Data
US 2013/0005329 A1 Jan. 3, 2013

Related U.S. Application Data

(63) Continuation of application No. PCT/JP2010/054258, filed on Mar. 12, 2010.

(51) Int. Cl.
*H04W 88/04* (2009.01)
*H04B 7/155* (2006.01)
*H04W 24/10* (2009.01)
*H04W 84/04* (2009.01)
*H04W 76/04* (2009.01)

(52) U.S. Cl.
CPC .......... *H04W 24/10* (2013.01); *H04W 84/047* (2013.01); *H04B 7/155* (2013.01); *H04W 76/04* (2013.01); *Y02B 60/50* (2013.01)
USPC ...................................... 455/422.1; 455/423

(58) Field of Classification Search
USPC ........... 455/7, 422.1, 423, 522; 370/279, 315, 370/328
See application file for complete search history.

(56) References Cited

U.S. PATENT DOCUMENTS

2012/0033609 A1* 2/2012 Suda .............................. 370/315

FOREIGN PATENT DOCUMENTS

| EP | 1 947 895 A1 | 7/2008 |
|---|---|---|
| JP | 04-200032 A | 7/1992 |
| JP | 2000-193697 A | 7/2000 |
| JP | 2005-252677 A | 9/2005 |
| JP | 2008-48202 A | 2/2008 |
| JP | 2008-295014 A | 12/2008 |
| JP | 2009-231990 A | 10/2009 |

OTHER PUBLICATIONS

International Search Report issued for corresponding International Patent Application No. PCT/JP2010/054258, mailed Jun. 8, 2010. English translation attached.

* cited by examiner

*Primary Examiner* — Sam Bhattacharya
(74) *Attorney, Agent, or Firm* — Myers Wolin, LLC

(57) ABSTRACT

An information receiving unit receives specific information for specifying a radio signal that uses a predetermined type of data transmitted by the mobile station. The radio signal receiving unit receives, on the basis of the specific information, the radio signal transmitted by the mobile station. A measuring unit measures reception quality of the radio signal received by the radio signal receiving unit. The quality transmitting unit transmits the reception quality of the radio signal measured by the measuring unit.

9 Claims, 10 Drawing Sheets

RELAY DEVICE, RELAY DEVICE CONTROL METHOD, AND RADIO COMMUNICATION SYSTEM

CROSS-REFERENCE TO RELATED APPLICATION

This application is a continuation of International Application No. PCT/JP2010/054258, filed on Mar. 12, 2010, the entire contents of which are incorporated herein by reference.

FIELD

The embodiments discussed herein are directed to a relay device, a relay device control method, and a radio communication system.

BACKGROUND

Mobile communication systems that perform communication using radio communication channels are currently coming into widespread use globally. In such radio communication systems, multiple base stations (BSs) are arranged in a service area and a mobile station (user equipment (UE)) communicates with another communication device (communication terminal) via one of the base stations. Each of the base stations has an area referred to as a cell within which radio communication can be performed between a mobile station and the base station.

However, when a mobile station is located close to the boundary of a cell of a base station, the communication state between the mobile station and the base station becomes worse and, in the worst case, establishment of communication is difficult. Furthermore, due to landscape constraints or due to being shielded by buildings, the communication state between a mobile station and a base station may possibly become worse or the establishment of communication may possibly be difficult.

Accordingly, in order to establish stable communication between a mobile station and a base station by overcoming such disadvantages, relay devices (relay stations) are arranged. The relay devices relay data transmission from a base station to a mobile station and also relay signal transmission from a mobile station to a base station. Specifically, instead of either a mobile station or a base station directly receiving a signal from the other, the mobile station or the base station receives, by using a relay device, a signal transmitted from the relay device. Thus, communication can be established between the base station and the mobile station.

Furthermore, in radio communication systems, in order to implement high-speed and high-volume radio communication, improvements to the currently used radio communication systems or the next-generation mobile communication systems are being actively discussed at standardization conferences related to, for example, the 3rd Generation Partnership Project (3GPP). In the 3GPP project, studies have been conducted on LTE advanced, which is an expansion of the Long Term Evolution (LTE) system that is one of the radio communication systems.

In LTE advanced, studied as part of the 3GPP project, the introduction of two types of relay devices is being studied: a relay device that does not transmit, to a mobile station, a signal used to specify the relay device and a relay device that transmits, to a mobile station, a signal used to specify the relay device. In the following, a description will be given of a relay device that does not transmit, to a mobile station, a signal used to specify the relay device.

A mobile station does not recognize a relay device as a relay device unless the relay device transmits a signal used to specify the relay device to a mobile station. Specifically, the mobile station does not recognize that a signal is being relayed even though a relay device is relaying the signal that is being transmitted between the mobile station and the base station. Accordingly, if a relay device that is not recognized as a relay device by a mobile station is used, the mobile station operates as if it is directly communicating with a base station.

In radio communication systems that use relay devices that are not recognized as a relay device by mobile stations, if a relay device relays user data, a mobile station receives the user data from the relay device. At this time, in some cases, the base station transmits, to the mobile station, data having the same content as the user data transmitted by the relay device. In such a case, the base station transmits the data such that the data transmitted to the mobile station by the base station is received when the mobile station receives the user data from the relay device. In contrast, if the signal transmitted by the base station is a common control signal containing information on the radio communication system or a control signal attached to the user data, the mobile station receives these signals from the base station. The control signal attached to the user data contains information needed to demodulate or decode the user data.

In radio communication systems that use relay devices, when communicating with a mobile station, there is a need for selecting which relay device relays which user data signal to be transmitted to a mobile station located in the cell of a base station. Accordingly, if a mobile station does not recognize the presence of a relay device, a base station selects a combination of a mobile station and a relay device. In the following, a method for selecting such a combination will be described. Each relay device receives a signal that is transmitted to the base station by a mobile station that makes a request to establish communication. Then, each relay device notifies the base station of received power of the signal transmitted from the mobile station that makes a request to establish communication. Then, by using the reception quality acquired from each relay device, the base station selects a relay device that relays the signal transmitted from the mobile station that makes a request to establish communication.

In the following, this conventional technology will be more specifically described with reference to FIG. 11. FIG. 11 is a sequence diagram illustrating a process for establishing communication between a mobile station and a base station via a relay device by using the conventional technology. The downward direction of the vertical lines in the plane of the drawing illustrated in FIG. 11 represents the elapse of time. Each of the vertical lines illustrates the operation in the chronological order it is performed by the device indicated at the top of the vertical line. In this example, a description will be given of a case in which the reception quality of the signal transmitted from a mobile station 91 to a base station 93 is poor at the base station 93 and the state of the radio communication between the mobile station 91 and the base station 93 is inferior. In the following, a description will be given by using received power as the reception quality.

The mobile station 91 needs to perform the synchronization when the mobile station 91 radioly receives a signal from the base station 93. Accordingly, the mobile station 91 needs to transmit a synchronization signal to the base station 93 in order to perform synchronization. For example, the synchronization signals can be used as different preamble signals in each base station 93.

The base station 93 notifies the mobile station 91 of the time at which the mobile station 91 transmits the synchronization signal (Step S901). This signal is a control signal and is directly received by the mobile station 91 without passing through a relay device 92.

The mobile station 91 arbitrarily selects a single code from among previously determined multiple codes (or a sequence) and creates a synchronization signal by using the code. For example, the code mentioned here indicates a code used by a computer to identify characters or figures. In the following, a description will be given of a case in which the mobile station 91 uses a code as a synchronization signal. In this example, it is assumed that each code has a number representing a mobile station itself. Then, the mobile station 91 transmits, to the base station 93, a synchronization signal at the time specified by the base station 93 (Step S902). At this time, the synchronization signal is also directly transmitted from the mobile station 91 to the base station 93 without passing through the relay device 92. At this time, the relay device 92 receives the synchronization signal that is transmitted from the mobile station 91 to the base station 93 (Step S903). However, the relay device 92 does not transfer the synchronization signal to the base station 93.

The relay device 92 acquires a code number from the synchronization signal. Furthermore, the relay device 92 measures the received power of the synchronization signal. Then, the relay device 92 transmits the code number of the synchronization signal and the received power to the base station 93 (Step S904).

The base station 93 receives the synchronization signal from the mobile station 91. Then, the base station 93 acquires the code number from the synchronization signal. Furthermore, the base station 93 measures the received power of the synchronization signal. Furthermore, the base station 93 acquires, from the relay device 92, the code number of the synchronization signal and the received power received by the relay device 92. Then, the base station 93 compares information on the synchronization signal received by the mobile station 91 with information on the synchronization signal acquired from the relay device 92 and determines whether the base station 93 allows the relay device 92 to relay communication to the mobile station 91 (Step S905). In this example, a description will be given of a case in which the base station 93 determines that it does allow the relay device 92 to relay communication to the mobile station 91.

The base station 93 notifies the mobile station 91 of the code number acquired from the synchronization signal (Step S906). At this time, in practice, the base station 93 notifies all of the mobile stations, which are present in the cell of the base station 93, of the code number.

The mobile station 91 determines whether the code number of the synchronization signal transmitted by the mobile station 91 matches the code number notified by the base station 93 (Step S907). If the mobile station 91 determines that the code numbers match, the mobile station 91 transmits, to the base station 93, a response signal indicating that the code number has been confirmed (Step S908).

The base station 93 receives the response signal transmitted from the mobile station 91 and specifies the mobile station 91 that has transmitted the synchronization signal containing the acquired code number. Then, the base station 93 instructs the relay device 92 to relay communication to the mobile station 91. Accordingly, the base station 93 establishes radio communication with the mobile station 91 via the relay device 92 (Step S909).

Furthermore, the following conventional technologies have been proposed as a technology for performing radio communication via a relay device. First, there is a conventional technology in which a mobile station determines, on the basis of the received power of a signal received from a base station, whether the mobile station acts as a relay device. Furthermore, there is also a conventional technology in which, in order to avoid limitation of the radio resources (frequency) allocated to a relay device or a mobile station, a base station notifies a relay device of the carrier to be used and makes the carrier used by each relay device different. Furthermore, there is also a conventional technology for monitoring the propagation path by a relay device notifying a base station of the received power of signals received from multiple mobile stations.

Patent Document 1: Japanese Laid-open Patent Publication No. 2008-048202

Patent Document 2: Japanese Laid-open Patent Publication No. 2009-231990

Patent Document 3: Japanese Laid-open Patent Publication No. 2005-252677

Patent Document 4: Japanese Laid-open Patent Publication No. 2000-193697

However, in the conventional technology described with reference to FIG. 11, in order to specify a mobile station that transmits a code number acquired by a relay device and a base station, after the mobile station has transmitted the code number, signal transmission needs to be repeated between the base station and the mobile station. Accordingly, it takes a long time to establish communication between the base station and the mobile station via the relay device.

Furthermore, to reduce the time for the establishment of communication between the base station and the mobile station via the relay device, the base station previously needs to designate a code number that is transmitted by the mobile station that is the target for the establishment of communication. However, the relay device does not recognize the code number designated by the relay device if the base station simply specifies the code number to the mobile station. Accordingly, the relay device also receives a radio signal containing another code number that is output from a mobile station that is other than the mobile station corresponding to the target for the establishment of communication in the cell and transmits the code number and the received power to the base station. For example, in the 3rd Generation (3G) system, 64 code numbers are present in a single cell, and a relay device needs to transmit a maximum of 64 code numbers and received power to the base station. Under such circumstances, the load on the relay device at the time communication is established becomes high, which increases the electrical power consumed by the relay device.

SUMMARY

According to an aspect of embodiments, A relay device includes, an information receiving unit that receives specific information for specifying a radio signal that uses a predetermined type of data transmitted by a predetermined mobile station, a radio signal receiving unit that receives, on the basis of the specific information, the radio signal that uses the predetermined type of the data transmitted by the predetermined mobile station, a measuring unit that measures reception quality of the radio signal that is received by the radio signal receiving unit, and a quality transmitting unit that transmits the reception quality of the radio signal measured by the measuring unit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments of the present invention will be explained with reference to accompanying drawings.

The relay device, the relay device control method, and the radio communication system disclosed in the present invention are not limited to the embodiments described below.

[a] First Embodiment

Figure 1:
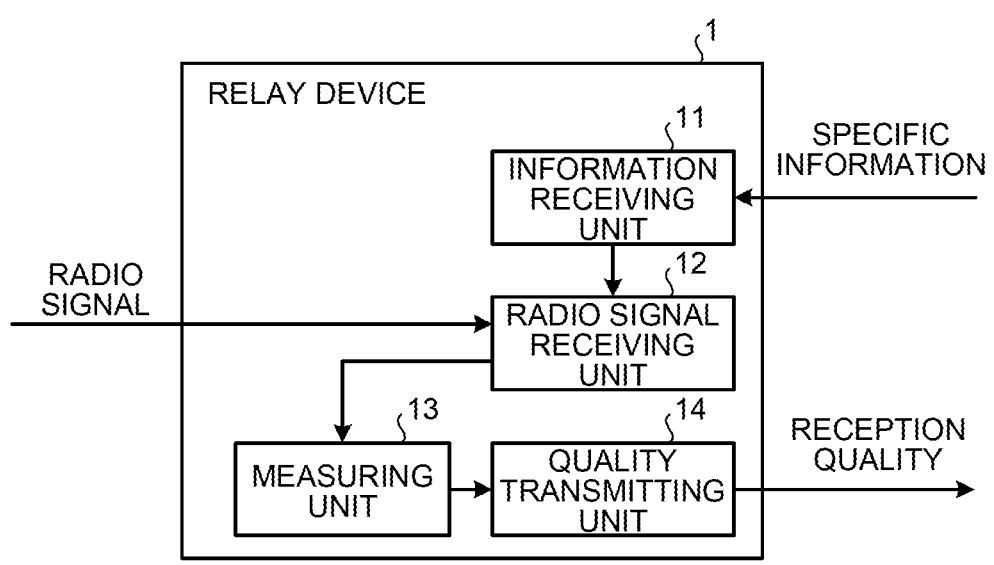
FIG. 1 is a block diagram illustrating a relay device according to a first embodiment.

FIG. 1 is a block diagram illustrating a relay device according to a first embodiment. As illustrated in FIG. 1, a relay device 1 according to a first embodiment includes an information receiving unit 11, a radio signal receiving unit 12, a measuring unit 13, and a quality transmitting unit 14.

The information receiving unit 11 receives specific information. The specific information mentioned here means information for specifying a radio signal that uses a predetermined type of data transmitted from a predetermined mobile station. The predetermined type of data mentioned here is a code sequence constituting, for example, a signal. A signal using the predetermined type of data indicates a radio signal that is constituted by, for example, a predetermined code sequence.

The radio signal receiving unit 12 receives, on the basis of the specific information received by the information receiving unit 11, a radio signal that uses a predetermined type of data transmitted from a predetermined mobile station to a base station.

The measuring unit 13 measures the reception quality of the radio signal received by the radio signal receiving unit 12.

The quality transmitting unit 14 transmits the reception quality of the radio signal measured by the measuring unit 13.

As described above, the relay device according to the first embodiment can specify, on the basis of the acquired specific information, from among multiple signals transmitted from various mobile stations, a radio signal that is transmitted from the specific mobile station to the base station. Accordingly, if the base station instructs the mobile station to transmit a specific radio signal, a relay device actively receives the reception quality of the specific radio signal transmitted from a specific mobile station and transmits it to the base station. The base station does not need, for the establishment of communication with the predetermined mobile station, to confirm with the specific mobile station that the reception quality transmitted from the relay device is the radio signal transmitted from the specific mobile station. Accordingly, it is possible to reduce the time taken to establish the communication between the mobile station and the base station via the relay device. Furthermore, because the relay device processes only the radio signal transmitted from the specified predetermined mobile station, the load can be reduced, thus reducing electrical power consumption. Furthermore, because the relay device processes only the radio signal transmitted from a predetermined mobile station, it is possible to reduce the amount of signals transmitted from the relay device to the base station, thus reducing the interference between signals.

[b] Second Embodiment

Figure 2:
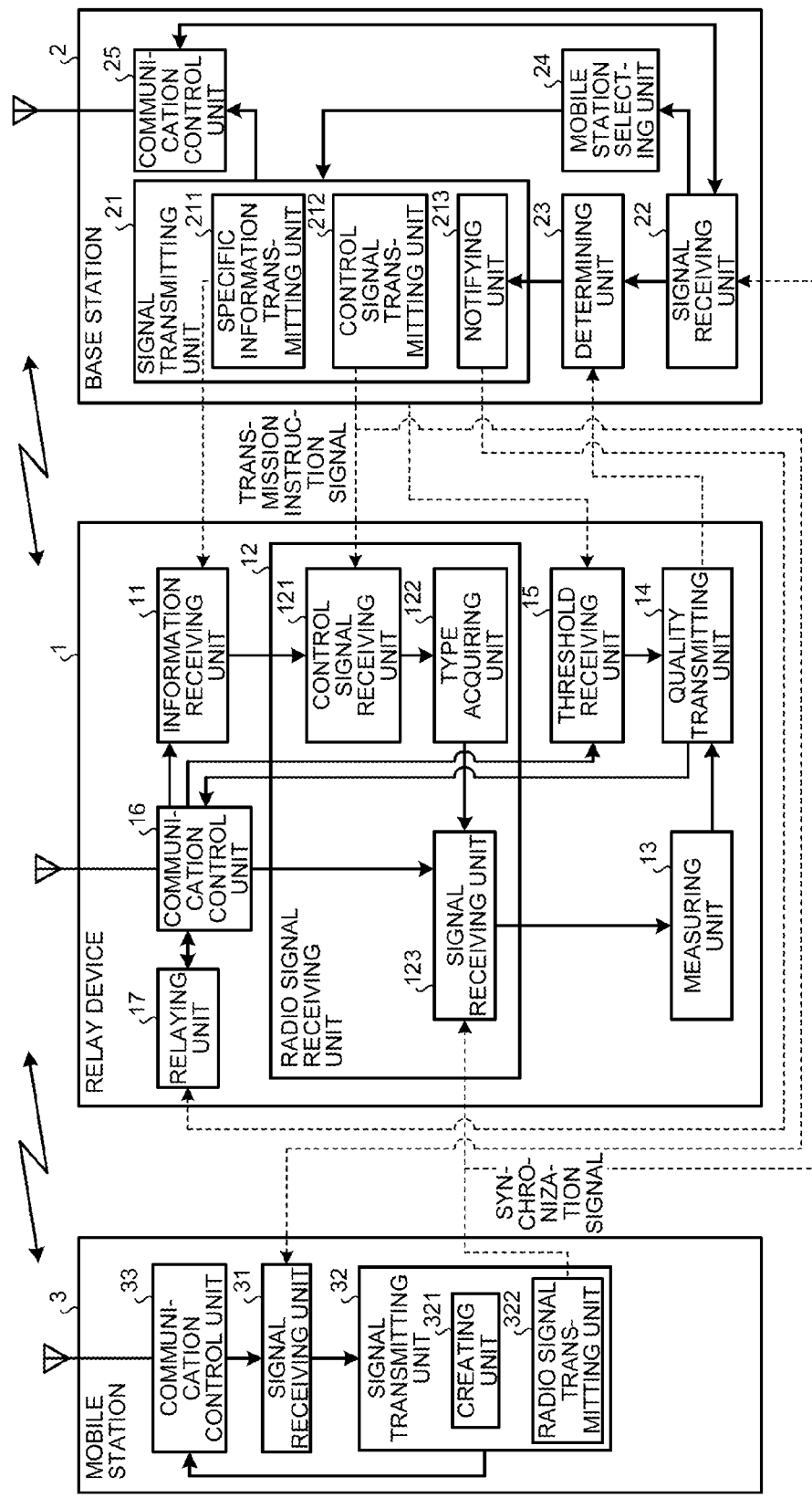
FIG. 2 is a block diagram illustrating a radio communication system that includes a relay device according to a second embodiment.

FIG. 2 is a block diagram illustrating a radio communication system that includes a relay device according to a second embodiment. First, the configuration of each unit will be specifically described with reference to FIG. 2. As illustrated in FIG. 2, a radio communication system according to the second embodiment includes the relay device 1, a base station 2, and a mobile station 3.

In FIG. 2, each unit communicates radioly. In FIG. 2, in order to easy to understand the delivery of the signal, the flow of a signal is represented by the dotted line. However, in practice, the signal represented by the dotted line is also transmitted and received via, using radio communication, a communication control unit 16 and a communication control unit 25 or a communication control unit 33.

In this example, it is assumed that the communication state between the base station 2 and the mobile station 3 becomes worse. Furthermore, it is assumed that, in the cell of the base station 2, a mobile station other than the mobile station 3 is also present. In the description below, a description will be given of a process for determining whether the relay device 1 is allowed to relay communication between the base station 2 and the mobile station 3; however, multiple mobile stations that are allowed to have their communications relayed by the relay device 1 may also be present. Furthermore, in the first embodiment, received power is used as an indication of reception quality.

As illustrated in FIG. 2, the relay device 1 according to the second embodiment includes the information receiving unit 11, the radio signal receiving unit 12, the measuring unit 13, the quality transmitting unit 14, a threshold receiving unit 15, the communication control unit 16, and a relaying unit 17.

The communication control unit 16 receives a radio signal from the base station 2 or the mobile station 3 and outputs it to the information receiving unit 11, the radio signal receiving unit 12, the quality transmitting unit 14, the measuring unit 13, the threshold receiving unit 15, and the relaying unit 17. Furthermore, the communication control unit 16 transmits, to the base station 2 or the mobile station 3 using a radio signal, a signal that is input from the information receiving unit 11, the radio signal receiving unit 12, the quality transmitting unit 14, the measuring unit 13, the threshold receiving unit 15, or the relaying unit 17. At this time, in practice, the information receiving unit 11, the radio signal receiving unit 12, the quality transmitting unit 14, the measuring unit 13, the threshold receiving unit 15, and the relaying unit 17 transmit and receive a signal from/to the base station 2 or the mobile station 3 via the communication control unit 16. However, in the following, for convenience of explanation, a description will sometimes be given as if the information receiving unit 11, the radio signal receiving unit 12, the quality transmitting unit 14, the measuring unit 13, the threshold receiving unit 15, and the relaying unit 17 seemingly transmit and receive a signal directly from/to the base station 2 or the mobile station 3.

The information receiving unit 11 receives identification information on the mobile station 3 from a specific information transmitting unit 211 in the base station 2, which will be described later. Then, the information receiving unit 11 outputs identification information on the mobile station 3 to a control signal receiving unit 121.

The threshold receiving unit 15 receives a threshold of the received power from a signal transmitting unit 21 in the base station 2, which will be described later. Then, the threshold receiving unit 15 outputs the threshold of the received power to the quality transmitting unit 14.

The radio signal receiving unit 12 includes the control signal receiving unit 121, a type acquiring unit 122, and a signal receiving unit 123.

The control signal receiving unit 121 includes a storage medium, such as a memory. The control signal receiving unit 121 receives an input of the identification information on the mobile station 3 from the information receiving unit 11. Then, the control signal receiving unit 121 stores therein the identification information on the mobile station 3.

Then, the control signal receiving unit 121 receives a signal transmitted from the base station 2 to each mobile station in the base station 2. Furthermore, the control signal receiving unit 121 determines whether the destination of the received signal contains the identification information on the mobile station 3. If the destination of the received signal contains the identification information on the mobile station 3, the control signal receiving unit 121 outputs the signal to the type acquiring unit 122. Here, the signal that contains the identification information on the mobile station 3 and that is contained in the destination of the signal received by the control signal receiving unit 121 is a control signal that instructs the mobile station 3 to transmit a radio signal using a predetermined type of data. In the following, the signal that instructs the radio signal to be transmitted to the mobile station 3 is also referred to be a "transmission instruction signal". Furthermore, the radio signal using a predetermined type of data transmitted from the mobile station 3 to the base station 2 is also a signal for synchronizing the mobile station 3 with the base station 2, and, in the following, it is also referred to as a "synchronization signal".

The type acquiring unit 122 receives an input of a transmission instruction signal from the control signal receiving unit 121. In the second embodiment, a code is used as data that is used for a synchronization signal. The code mentioned here is, for example, a code for identifying characters or figures by a computer. A data type mentioned in this embodiment is a previously determined code number. For example, if it is previously determined that code numbers 1 to 10 are to be used, the data type mentioned here is a number attached to each code, i.e., 1 to 10 in this case, associated with each code. The transmission instruction signal contains an instruction indicating, for example, "creating of a synchronization signal using code number 5. The type acquiring unit 122 acquires, from a transmission instruction signal, a code number specified by the transmission instruction signal. In this example, a description will be given of a case in which the type acquiring unit 122 acquires number 5 as a code number. Furthermore, in the embodiment, a code is used as data used in a synchronization signal; however, any data may also be uses as long as the synchronization signal can be specified by the data. For example, a sequence may also be used. In the second embodiment, specifying a synchronization signal is used to specify a mobile station that is the transmission source of the synchronization signal.

The type acquiring unit 122 outputs a code number acquired from the transmission instruction signal to the signal receiving unit 123. In this case, the type acquiring unit 122 outputs number 5 as a code number to the signal receiving unit 123.

The signal receiving unit 123 receives an input of the code number from the type acquiring unit 122. In this example, the signal receiving unit 123 receives number 5 as a code number from the type acquiring unit 122.

Then, the signal receiving unit 123 receives a signal that is transmitted from each mobile station in a cell of the base station 2 to the base station 2. Furthermore, the signal receiving unit 123 determines whether each signal received from each mobile station is a radio signal that uses a code having code number 5 that is input from the signal receiving unit 123. If the signal is not a radio signal that uses a code having the code number 5, the signal receiving unit 123 discards the signal. In contrast, if the signal is a radio signal that does not uses a code having the code number 5, the signal receiving unit 123 outputs the radio signal to the measuring unit 13. At this time, if the signal is a radio signal using code number 5, i.e., a radio signal containing a code having a number specified by a transmission instruction signal, the signal is a synchronization signal that is output from the mobile station 3. Accordingly, in the following, a description will be given of a case in which the signal receiving unit 123 determines that the signal contains code number 5, and the signal that is output to the measuring unit 13 is referred to as a "synchronization signal from the mobile station 3".

In the following, a method for determining a radio signal having code number 5 performed by the signal receiving unit 123 will be described in further detail. If the signal receiving unit 123 receives, from the type acquiring unit 122, an input of number 5 that corresponds to a code number, the signal receiving unit 123 creates a replica of a code having code number 5. Then, the signal receiving unit 123 multiplies each signal received from each mobile station by the replica of the code having code number 5. At this stage, if the signal types are the same, a high peak is obtained after the multiplication. Accordingly, the signal receiving unit 123 determines that a signal indicated by a high peak after the multiplication is the radio signal that uses code number 5.

The measuring unit 13 receives, from the signal receiving unit 123, an input of the synchronization signal transmitted from the mobile station 3. Then, the measuring unit 13 measures the received power of the synchronization signal transmitted from the mobile station 3. The measurement of the received power can be performed by measuring the intensity of the synchronization signal transmitted from the mobile station 3. The measuring unit 13 outputs, to the quality transmitting unit 14, the measured received power of the synchronization signal transmitted from the mobile station 3.

The quality transmitting unit 14 has a storage medium, such as a memory. Furthermore, the quality transmitting unit 14 stores a threshold of the received power received from the threshold receiving unit 15 in a storage medium in the quality transmitting unit 14.

The quality transmitting unit 14 receives, from the measuring unit 13, an input of the received power of the synchronization signal transmitted from the mobile station 3. Then, the quality transmitting unit 14 compares a threshold of received power stored in the quality transmitting unit 14 with the received power of the synchronization signal transmitted from the mobile station 3 and determines whether the received power of the synchronization signal transmitted from the mobile station 3 is equal to or greater than a threshold.

If the received power of the synchronization signal transmitted from the mobile station 3 is equal to or greater than a threshold, the quality transmitting unit 14 outputs, to a determining unit 23 in the base station 2 which will be described later, the received power of the synchronization signal transmitted from the mobile station 3.

When the quality transmitting unit 14 outputs only the received power that is equal to or greater than the threshold, if the received power of the signal from the mobile station 3 is weak and thus the relay device 1 does not relay the communication between the mobile station 3 and the base station 2, the received power is not transmitted to the base station 2. Accordingly, it is possible to suppress unnecessary input of information to the base station 2, thus reducing the processing load on the base station 2.

The relaying unit 17 receives, from a notifying unit 213 which will be described later, an instruction to relay communication between the base station 2 and the mobile station 3. Then, the relaying unit 17 relays the communication between the base station 2 and the mobile station 3.

As illustrated in FIG. 2, the base station 2 includes the signal transmitting unit 21, a signal receiving unit 22, the determining unit 23, a mobile station selecting unit 24, and the communication control unit 25.

Similarly to the relay device 1, as in the base station 2, in practice, the signal transmitting unit 21, the signal receiving unit 22, the determining unit 23, and the mobile station selecting unit 24 also transmit and receive a signal from/to the relay device 1 or the mobile station 3 via the communication control unit 25. However, in the following, for convenience of explanation, a description will sometimes be given as if the signal transmitting unit 21, the signal receiving unit 22, the determining unit 23, and the mobile station selecting unit 24 conceivably transmit and receive a signal directly from/to the relay device 1 or the mobile station 3.

The mobile station selecting unit 24 monitors the communication state of each signal that is received by the signal receiving unit 22 and that is transmitted from each mobile station in a cell of the base station 2 and extracts a mobile station whose communication state is poor. Specifically, the mobile station selecting unit 24 previously stores therein a threshold of the radio characteristics. The cell mentioned here is, for example, a region reached by radio waves from the base station 2. Then, the mobile station selecting unit 24 measures the radio characteristics of the signal received by the signal receiving unit 22. If the radio characteristics are equal to or less than a threshold, the mobile station selecting unit 24 determines that the radio characteristics are inferior. Then, the mobile station selecting unit 24 extracts the mobile station that has transmitted the signal as the mobile station whose communication state is poor. In the following, a description will be given of a case in which the mobile station selecting unit 24 extracts the mobile station 3 as the mobile station whose communication state is poor.

Then, the mobile station selecting unit 24 outputs, to the signal transmitting unit 21, information on the mobile station extracted as the mobile station having a poor communication state.

The signal transmitting unit 21 includes the specific information transmitting unit 211, a control signal transmitting unit 212, and the notifying unit 213. Furthermore, the signal transmitting unit 21 has a storage medium, such as a memory or a hard disk (not illustrated). Furthermore, the signal transmitting unit 21 stores a threshold of the received power previously determined in a storage medium included in the signal transmitting unit 21. At this stage, in the second embodiment, the signal transmitting unit 21 uses the same threshold for both the received power of the mobile station and the relay device; however, the configuration is not limited thereto. For example, received power used for each mobile station or for each relay device may also be different.

Furthermore, the signal transmitting unit 21 includes a counter. If information on a mobile station is input from the mobile station selecting unit 24, the signal transmitting unit 21 resets the counter. Then, if the control signal transmitting unit 212 transmits the transmission instruction signal to the mobile station 3, the signal transmitting unit 21 increment its own counter. Then, if the counter reaches the number corresponding to the number of mobile stations that is input from the mobile station selecting unit 24, the signal transmitting unit 21 ends the transmission of the transmission signal.

The signal transmitting unit 21 receives, from the mobile station selecting unit 24, an input of the information on the mobile station whose communication state is poor. Then, the signal transmitting unit 21 transmits, to the threshold receiving unit 15, the threshold of the received power, in the relay device 1, of the signal transmitted from the mobile station 3. In the second embodiment, the transmission of the threshold of the received power is performed together with the transmission of the identification information of the mobile station 3 performed by the specific information transmitting unit 211, which will be described later.

The specific information transmitting unit 211 transmits identification information on a mobile station whose communication state is poor. In this example, the specific information transmitting unit 211 transmits the identification information on the mobile station 3. If there are multiple mobile stations that can be determined as being relayed by the relay device 1, the specific information transmitting unit 211 transmits, to the information receiving unit 11, the identification information on the multiple mobile stations.

The control signal transmitting unit 212 includes a storage medium, such as a memory or a hard disk. Furthermore, the control signal transmitting unit 212 previously stores therein a code number. In the second embodiment, the control signal transmitting unit 212 stores therein, as code numbers, 1 to 10 types of numbers.

If multiples mobile stations whose communication states are poor are present, the control signal transmitting unit 212 allocates a different code number to each mobile station. In the second embodiment, it is assumed that the control signal transmitting unit 212 allocates code number 5 to the mobile station 3. After the specific information transmitting unit 211 transmits the identification information, the control signal transmitting unit 212 transmits, to the mobile station 3, a transmission instruction signal that instructs the radio signal that uses code number 5 to be transmitted to the base station 2.

When the notifying unit 213 receives, from the determining unit 23, which will be described later, the determination indicating that the relay of the communication to the mobile station 3 is performed by the relay device 1, the notifying unit 213 notifies the relaying unit 17 of the instruction to relay the communication to the mobile station 3.

The signal receiving unit 22 receives a signal from each mobile station. The mobile station selecting unit 24 monitors the reception state of a signal transmitted from each mobile station in the signal receiving unit 22.

Furthermore, the signal receiving unit 22 receives a response from the mobile station 3 to the transmission instruction signal that is transmitted from the control signal transmitting unit 212. Specifically, the signal receiving unit 22 receives, from a radio signal transmitting unit 322, the synchronization signal that uses code number 5. The signal receiving unit 22 then outputs, to the determining unit 23, the received synchronization signal that uses code number 5 and the identification information on the mobile station 3.

The determining unit 23 receives, from the signal receiving unit 22, an input of the received synchronization signal that uses code number 5 and the identification information on the mobile station 3. Furthermore, the determining unit 23 receives, from the quality transmitting unit 14, an input of the received power of the synchronization signal and the identification information on the synchronization signal related to the transmission source.

The determining unit 23 determines whether the identification information received from the relay device 1 matches the identification information received from the signal receiving unit 22. If the identification information match, the determining unit 23 determines whether it allows the relay device 1 to communicate with the mobile station 3. For example, the determining unit 23 compares the received power, in the relay device 1, of the synchronization signal transmitted from the mobile station 3 with the received power, in another relay device, of the synchronization signal transmitted from the mobile station 3 and allows a relay device having greater received power to perform a relay. Furthermore, as another method, the determining unit 23 may count the number of mobile stations relayed by each relay device that transmits the received power and may determine that it allows a relay device that relays the minimum number of mobile stations to perform a relay. In this example, it is assumed that the determining unit 23 determines that it allows the relay device 1 to relay the communication to the mobile station 3. The determining unit 23 outputs, to the notifying unit 213, information indicating that the determining unit 23 allows the relay device 1 to relay communication to the mobile station 3.

As illustrated in FIG. 2, the mobile station 3 includes a signal receiving unit 31, a signal transmitting unit 32, and the communication control unit 33.

As in the mobile station 3, similarly to the relay device 1, in practice, the signal receiving unit 31 and the signal transmitting unit 32 transmit and receive a signal from/to the relay device 1 or the base station 2 via the communication control unit 33. However, in the following, for convenience of explanation, a description will sometimes be given as if the signal receiving unit 31 and the signal transmitting unit 32 seemingly transmit and receive a signal directly from/to the relay device 1 or the base station 2.

The signal receiving unit 31 receives, from the control signal transmitting unit 212, a control signal (transmission instruction signal) that instructs a synchronization signal using code number 5 to be transmitted. The signal receiving unit 31 outputs, to the signal transmitting unit 32, information on code number 5 designated by the signal transmitting unit 32 and information indicating that a transmission instruction of the synchronization signal is received.

The signal transmitting unit 32 includes a creating unit 321 and the radio signal transmitting unit 322. The signal transmitting unit 32 transmits, for example, a signal containing communication contents to the base station 2. Furthermore, the signal transmitting unit 32 receives, from the signal receiving unit 31, information on the designated code number 5 and information on the transmission instruction of the synchronization signal.

By using the information on code number 5 received from the signal receiving unit 31, the creating unit 321 creates a synchronization signal.

The radio signal transmitting unit 322 transmits, to the base station 2, the synchronization signal created by the creating unit 321. For example, a preamble signal may be used for the synchronization signal.

Figure 3:
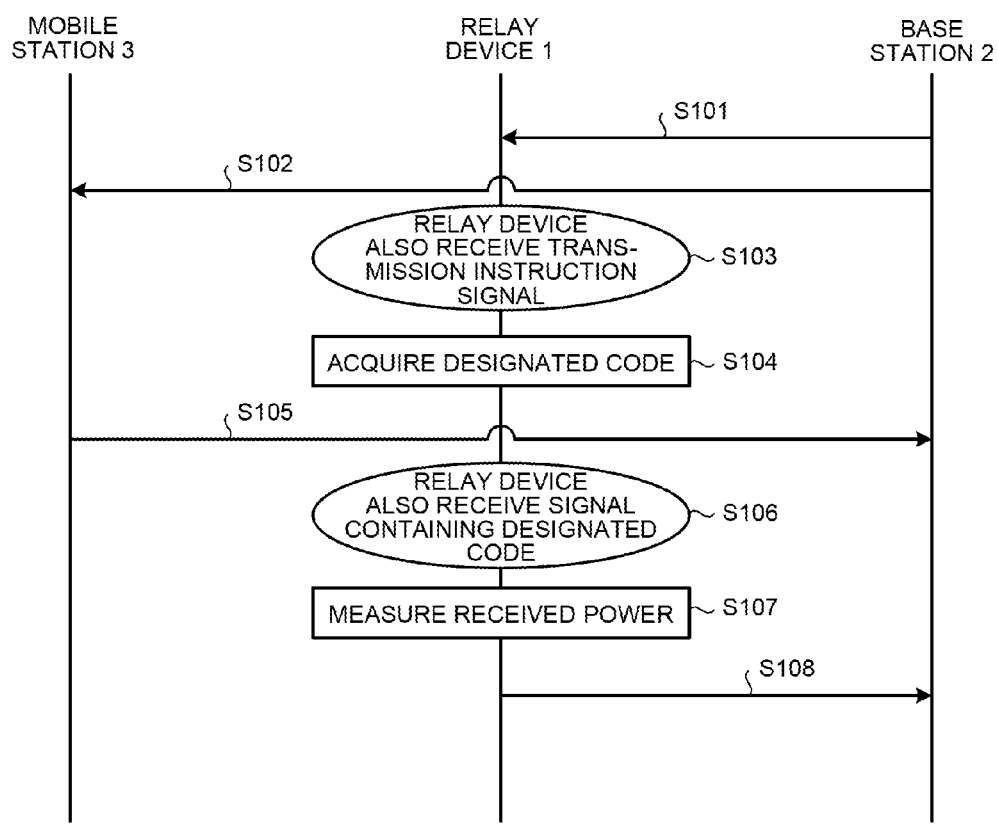
FIG. 3 is a sequence diagram illustrating the flow of a relay device determination process performed in the radio communication system according to the second embodiment.

In the following, the flow of the overall relay device determination process performed in the radio communication system will be described with reference to FIG. 3. FIG. 3 is a sequence diagram illustrating the flow of a relay device determination process performed in the radio communication system according to the second embodiment. The downward direction of the vertical axis in the plane of the drawing illustrated in FIG. 3 represents the elapse of time. Each of the vertical lines illustrates the operation performed by the device indicated at the top of the vertical lines in the plane of the drawing. Each arrow connecting to the vertical line indicates that data flows in the direction indicated by the arrow.

The base station 2 transmits, to the relay device 1, identification information on the mobile station 3 and a threshold of the received power. Then, the relay device 1 receives, from the base station, the identification information on the mobile station 3 and the threshold of the received power (Step S101).

Subsequently, the base station 2 transmits, to the mobile station 3, a control signal (transmission instruction signal) that instructs the transmission of a radio signal (synchronization signal) that is used to determine which relay device is used for the communication between the mobile station 3 and the base station 2. Here, the transmission instruction signal contains a designated code number that is used for the identification information on the mobile station 3 and used for the synchronization signal transmitted by the mobile station 3. In the following, a description will be given of a case in which code number 5 is designated as a code number that is used for a synchronization signal for a transmission instruction signal. The mobile station 3 receives a transmission instruction signal from the base station 2 (Step S102).

The relay device 1 acquires the signal that is output from the base station 2 and determines whether the identification information on the mobile station 3 is contained in the acquired signal. Then, if the identification information on the mobile station 3 is contained in the acquired signal, the relay device 1 receives the signal. The word "acquires" mentioned here means that the signal is simply obtained and, in such a case, it is not determined whether each signal is used for a process performed later or whether each signal is discarded. In contrast, the word "receives" mentioned here means that a signal is received by determining that the signal is used for a process performed later (for example, a process performed at Step S104). In this way, the relay device 1 actively receives the transmission instruction signal that is transmitted to the mobile station 3 (Step S103). The word "actively" mentioned here means that the relay device 1 arbitrarily acquires a signal that is not to be transmitted to the relay device 1 by the base station 2. In other words, the actively mentioned here means that the base station 2 does not detect that the relay device 1 receives the transmission instruction signal.

The relay device 1 acquires, from the transmission instruction signal received from the base station 2, a code number designated as a data type to be contained in a synchronization signal (Step S104). In this case, the relay device 1 acquires number 5 as a code number.

The mobile station 3 creates a synchronization signal containing the data type designated by the transmission instruction signal. In this case, the mobile station 3 creates a synchronization signal containing code number 5. Then, the mobile station 3 transmits the created synchronization signal to the base station 2 (Step S105).

The relay device 1 acquires a signal from each mobile station located in a cell of the base station 2. Then, the relay device 1 determines whether the acquired signal contains the code number that is designated by the base station 2 with respect to the mobile station 3 and that is designated to be contained in the synchronization signal. If the acquired signal contains the designated code number, the relay device 1 receives the signal containing the designated code number (Step S106). The word "acquires" mentioned here means that the signal is simply obtained and, in such a case, it is not determine whether each signal is used for a process performed later or whether each signal is discarded. In contrast, the word "receives" mentioned here means that a signal is received by determining that the signal is used for a process performed later (for example, a process performed at Step S107). At this stage, if the signal contains the designated code number, the signal is the synchronization signal transmitted from the mobile station 3. Accordingly, the relay device 1 can determine that the signal transmitted from the mobile station 3 is the synchronization signal and receive it. In this example, the relay device 1 receives the signal containing code number 5.

The relay device 1 measures the received synchronization signal transmitted from the mobile station 3 and, more specifically, measures the received power of the radio signal containing code number 5 (Step S107).

Then, the relay device 1 determines whether the received power of the synchronization signal transmitted from the mobile station 3 is equal to or greater than the threshold of the received power received from the base station 2. If the relay device 1 determines that the received power of the synchronization signal transmitted from the mobile station 3 is equal to or greater than the threshold, the relay device 1 transmits, to the base station 2, the received power of the synchronization signal transmitted from the mobile station 3 together with the identification information on the mobile station 3 (Step S108).

Accordingly, the base station 2 can acquire the received power, in the relay device 1, of the synchronization signal transmitted from the mobile station 3 and thus determine whether the base station 2 allows the relay device 1 to relay the communication to the mobile station 3. If the base station 2 determines that it does allow the relay device 1 to relay the communication to the mobile station 3, the base station 2 instructs the relay device 1 to relay the communication to the mobile station 3. The subsequent communication between the base station 2 and the mobile station 3 is performed via the relay device 1.

Figure 4:
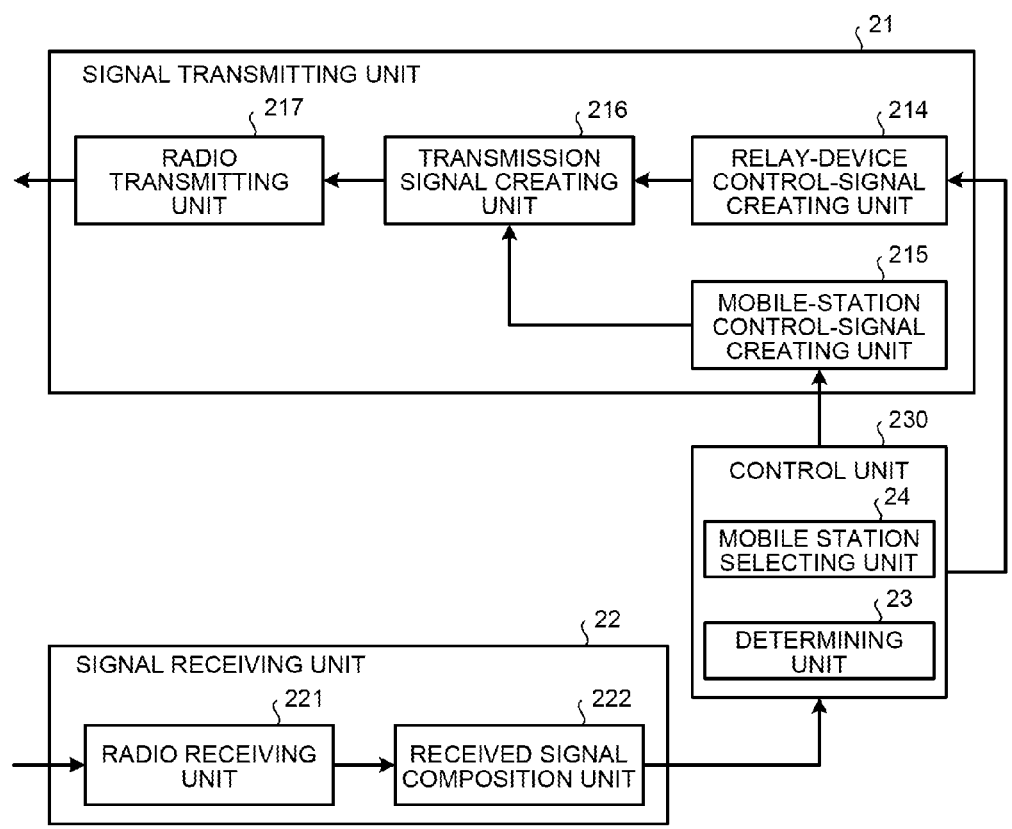
FIG. 4 is a block diagram illustrating, in detail, a base station according to the second embodiment.
Figure 5:
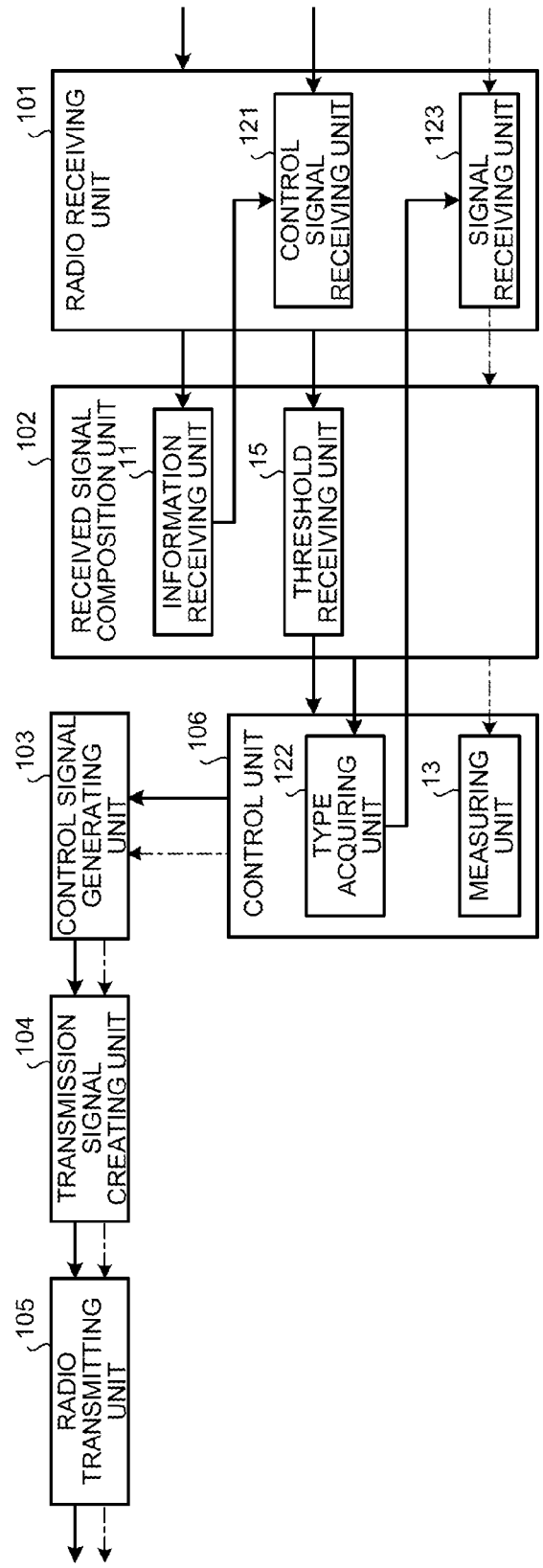
FIG. 5 is a block diagram illustrating, in detail, a relay device according to the second embodiment.
Figure 6:
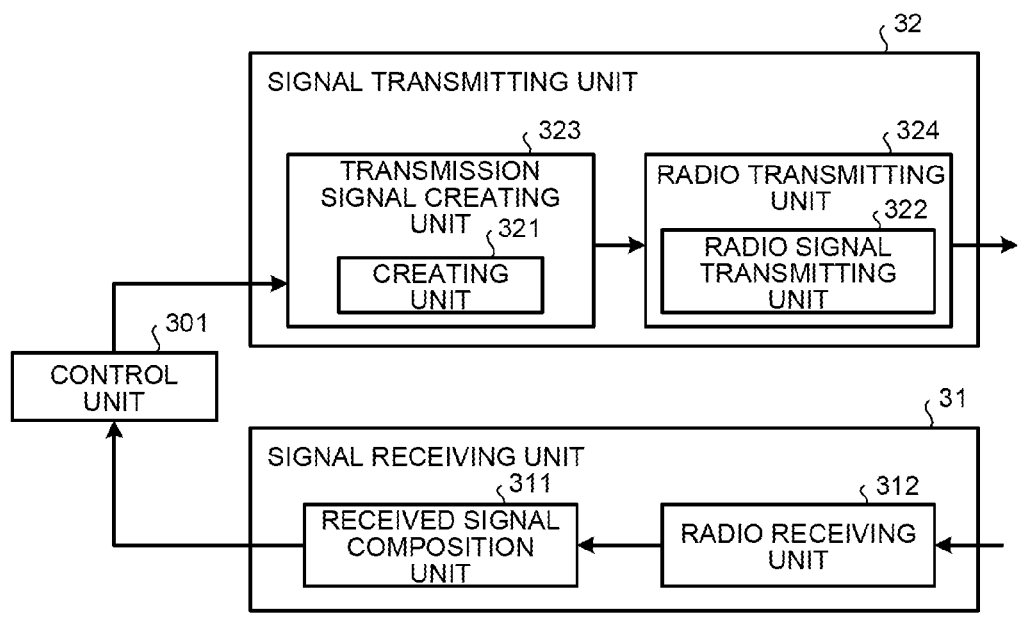
FIG. 6 is a block diagram illustrating, in detail, a mobile station according to the second embodiment.

In the following, the relay device 1, the base station 2, and the mobile station 3 will be more specifically described with reference to FIGS. 4 to 6. FIG. 4 is a block diagram illustrating, in detail, a base station according to the second embodiment. FIG. 5 is a block diagram illustrating, in detail, a relay device according to the second embodiment. FIG. 6 is a block diagram illustrating, in detail, a mobile station according to the second embodiment. To simplify the description, FIG. 2 illustrates only the parts needed to describe the function of each unit. In contrast, for a more detailed description, FIGS. 4 to 6 illustrate more closely the configuration of each unit to show its actual operation. Furthermore, FIGS. 4 to 6 also illustrate the parts that are not illustrated in FIG. 2.

First, the base station 2 will be described in detail below with reference to FIG. 4. As illustrated in more detail in FIG. 4, the base station 2 includes a control unit 230 in addition to the signal transmitting unit 21 and the signal receiving unit 22.

The signal receiving unit 22 includes a radio receiving unit 221 and a received signal composition unit 222.

The radio receiving unit 221 receives a signal transmitted from the relay device 1 or the mobile station 3. Then, the radio receiving unit 221 outputs the received signal to the received signal composition unit 222.

The received signal composition unit 222 receives an input of the signal from the radio receiving unit 221. Then, the received signal composition unit 222 performs a composition process on the signal received from the radio receiving unit 221. The received signal composition unit 222 outputs the signal subjected to the composition to the control unit 230.

The control unit 230 includes the determining unit 23 and the mobile station selecting unit 24. When the mobile station selecting unit 24 receives the signal subjected to the composition by the received signal composition unit 222, the mobile station selecting unit 24 monitors the communication state with the mobile station that transmits the signal and selects a mobile station whose communication state is poor. In this example, it is assumed that the mobile station selecting unit 24 extracts the mobile station 3 as the mobile station whose communication state is poor.

Then, the control unit 230 controls a relay-device control-signal creating unit 214 such that it creates a control signal that contains identification information on the mobile station 3 that is the mobile station whose communication state is poor and that is selected by the mobile station selecting unit 24. Furthermore, the control unit 230 controls a mobile-station control-signal creating unit 215 such that it creates a control signal containing a transmission instruction that contains a specific code number (in this case, code number 5) with respect to the mobile station 3.

Furthermore, the determining unit 23 receives, from the received signal composition unit 222, an input of the synchronization signal transmitted from the mobile station 3 and the identification information on the mobile station 3 contained in the synchronization signal. Furthermore, the determining unit 23 receives, from the received signal composition unit 222, an input of the received power that is input from the relay device 1 and the identification information on the mobile station 3. Then, the determining unit 23 determines whether it allows the relay device 1 to relay the communication to the mobile station 3. If the relay device 1 is allowed to relay the communication to the mobile station 3, the control unit 230 controls the relay-device control-signal creating unit 214 such that it creates a control signal that instructs the communication between the relay device 1 and the mobile station 3 to be relayed.

The signal transmitting unit 21 includes the relay-device control-signal creating unit 214, the mobile-station control-signal creating unit 215, a transmission signal creating unit 216, and a radio transmitting unit 217. A part of the function performed by the relay-device control-signal creating unit 214, the transmission signal creating unit 216, and the radio transmitting unit 217 in combination corresponds to an example of the specific information transmitting unit 211 and the control signal transmitting unit 212. Furthermore, a part of the function performed by the mobile-station control-signal creating unit 215, the transmission signal creating unit 216, and the radio transmitting unit 217 in combination corresponds to an example of the control signal transmitting unit 212.

Under the control of the control unit 230, the relay-device control-signal creating unit 214 creates a control signal containing the identification information on the mobile station 3. Then, the relay-device control-signal creating unit 214 outputs, to the transmission signal creating unit 216, the created control signal containing the identification information on the mobile station 3. Furthermore, under the control of the control unit 230, the relay-device control-signal creating unit 214 creates a control signal that instructs the relay device 1 to relay the communication to the mobile station 3. Then, the relay-device control-signal creating unit 214 outputs, to the transmission signal creating unit 216, the created control signal that instructs the relay device 1 to relay the communication to the mobile station 3.

Under the control of the control unit 230, the mobile-station control-signal creating unit 215 creates a control signal of the transmission instruction containing code number 5 with respect to the mobile station 3. Then, the mobile-station control-signal creating unit 215 outputs, to the transmission signal creating unit 216, the created control signal of the transmission instruction containing the designated code number 5 with respect to the mobile station 3.

When the transmission signal creating unit 216 receives, from the relay-device control-signal creating unit 214, the control signal containing the identification information on the mobile station 3, the transmission signal creating unit 216 creates a transmission signal containing the identification information on the mobile station 3. When the transmission signal is created, encoding is also performed. Then, the transmission signal creating unit 216 outputs, to the radio transmitting unit 217, the transmission signal containing the identification information on the mobile station 3. Furthermore, the transmission signal creating unit 216 receives, from the relay-device control-signal creating unit 214, the control signal that instructs the relay device 1 to relay the communication to the mobile station 3 and creates a transmission signal that instructs the communication to be relayed to the mobile station 3. Then, the transmission signal creating unit 216 outputs, to the radio transmitting unit 217, the transmission signal that instructs the communication to be relayed to the mobile station 3. Furthermore, the transmission signal creating unit 216 receives, from the mobile-station control-signal creating unit 215, an input of the control signal of the transmission instruction containing the designated code number 5 with respect to the mobile station 3. Then, the transmission signal creating unit 216 creates a transmission instruction signal that is a transmission signal for the transmission instruction containing designated code number 5. Then, the transmission signal creating unit 216 outputs, to the radio transmitting unit 217, the created transmission instruction signal.

The radio transmitting unit 217 transmits, to the relay device 1 or the mobile station 3, the transmission signal that instructs the communication to be relayed to the mobile station 3 and the transmission instruction signal.

In the following, the relay device 1 will be described in detail with reference to FIG. 5. The relay device 1 includes a radio receiving unit 101, a received signal composition unit 102, a control signal generating unit 103, a transmission signal creating unit 104, a radio transmitting unit 105, and a control unit 106. A part of the function performed by the radio receiving unit 101, the received signal composition unit 102, and the control unit 106 illustrated in FIG. 5 in combination corresponds to an example of the radio signal receiving unit 12. Furthermore, a part of the function performed by the control signal generating unit 103, the transmission signal creating unit 104, and the radio transmitting unit 105 in combination corresponds to an example of the quality transmitting unit 14. Furthermore, a part of the function performed by the radio receiving unit 101, the received signal composition unit 102, the control signal generating unit 103, the transmission signal creating unit 104, the radio transmitting unit 105, and the control unit 106 corresponds to an example of the relaying unit 17. Furthermore, in FIG. 5, the arrow indicated by the solid line represents the flow of the signal from the base station 2, whereas the arrow indicated by the dashed line represents the flow of the signal from the mobile station 3.

The radio receiving unit 101 receives a signal from the base station 2 or the mobile station 3. Then, the radio receiving unit 101 outputs, to the received signal composition unit 102, a signal transmitted from the base station 2 or the mobile station 3. Furthermore, the radio receiving unit 101 includes the control signal receiving unit 121. Then, the control signal receiving unit 121 receives, from the information receiving unit 11, an input of the identification information on the mobile station 3. Then, from among the signals transmitted from the base station 2, the control signal receiving unit 121 acquires the transmission instruction signal transmitted to the mobile station 3. Then, the control signal receiving unit 121 outputs, to the received signal composition unit 102, the transmission instruction signal that is transmitted to the mobile station 3. Furthermore, the radio receiving unit 101 receives a signal containing a threshold of the received power from the base station 2. Then, the radio receiving unit 101 outputs, to the received signal composition unit 102, the signal containing the threshold of the received power. Furthermore, the signal receiving unit 123 in the radio receiving unit 101 receives, from the type acquiring unit 122, an input of the replica of code number 5 that is designated by the transmission instruction signal. Then, from among the signals transmitted by each mobile station to the base station 2, the radio receiving unit 101 specifies the signal having the highest peak when the replica of code number 5 is multiplied. Then, the radio receiving unit 101 receives the specified signal as the synchronization signal transmitted from the mobile station 3. The radio receiving unit 101 outputs, to the received signal composition unit 102, the synchronization signal transmitted from the mobile station 3.

The received signal composition unit 102 performs the composition process on the signal that is input from the radio receiving unit 101. The information receiving unit 11 in the received signal composition unit 102 extracts, from among the composition signals, a signal that contains the identification information on the mobile station that is the destination of the transmission instruction signal and receives the identification information on the mobile station that is the destination of the transmission instruction signal. In the embodiment, the information receiving unit 11 receives the identification information on the mobile station 3. Then, the information receiving unit 11 outputs the identification information on the mobile station 3 to the control signal receiving unit 121 in the radio receiving unit 101. Furthermore, the received signal composition unit 102 performs the composition process on the signal within the range of the threshold of the received power received from the radio receiving unit 101 and outputs the threshold of the received power to the control unit 106. Furthermore, the received signal composition unit 102 receives, from the radio receiving unit 101, the transmission instruction signal transmitted from the base station 2 to the mobile station 3 and the synchronization signal transmitted from the mobile station 3 to the base station 2 and performs the composition process. Then, the received signal composition unit 102 outputs, to the control unit 106, the transmission instruction signal and the synchronization signal that are subjected to the composition.

The control unit 106 includes the type acquiring unit 122 and the measuring unit 13. The control unit 106 performs the overall controls of the operation of the relay device 1. Furthermore, when the control unit 106 relays the communication between the base station 2 and the mobile station 3, the control unit 106 controls the control signal generating unit 103 such that it creates a control signal for forwarding the signal that is received by the radio receiving unit 101.

The type acquiring unit 122 receives, from the received signal composition unit 102, an input of the transmission instruction signal that is transmitted from the base station 2 to the mobile station 3. Then, the type acquiring unit 122 acquires the code number that is designated by the transmission instruction signal. In this case, the type acquiring unit 122 acquires code number 5. Then, the type acquiring unit 122 creates a replica of the code number 5 and outputs it to the signal receiving unit 123.

The measuring unit 13 receives, from the received signal composition unit 102, an input of the synchronization signal transmitted from the mobile station 3. Then, the measuring unit 13 measures the received power of the synchronization signal transmitted from the mobile station 3.

The control unit 106 receives, from the threshold receiving unit 15, an input of the threshold of the received power. Then, if the received power measured by the measuring unit 13 is equal to or greater than the threshold, the control unit 106 controls the control signal generating unit 103 such that the control signal generating unit 103 creates a control signal that transmits, to the base station, the measurement results and the identification information on the transmission source of the synchronization signal.

Under the control of the control unit 106, the control signal generating unit 103 creates a control signal. Then, the control signal generating unit 103 outputs the created control signal to the transmission signal creating unit 104. For example, under the control of the control unit 106, the control signal generating unit 103 creates a control containing the received power of the synchronization signal and the identification information on the transmission source contained in the synchronization signal. Then, the control signal generating unit 103 outputs, to the transmission signal creating unit 104, control signal containing the received power of the synchronization signal and the identification information on the transmission source contained in the synchronization signal.

The transmission signal creating unit 104 receives an input of the control signal from the control signal generating unit 103 and creates a transmission signal that contains the control signal. When the transmission signal is created, encoding is also performed. The transmission signal creating unit 104 outputs the created transmission signal to the radio transmitting unit 105. For example, the transmission signal creating unit 104 receives, from the control signal generating unit 103, an input of the control signal containing the received power of the synchronization signal and the identification information on the transmission source contained in the synchronization signal. Then, the transmission signal creating unit 104 creates a transmission signal containing the received power of the synchronization signal and the identification information on the transmission source contained in the synchronization signal.

The radio transmitting unit 105 transmits, to the base station 2 or the mobile station 3, the transmission signal that is input from the transmission signal creating unit 104.

In the following, the mobile station 3 will be described in detail with reference to FIG. 6. The mobile station 3 includes the signal receiving unit 31, a control unit 301, and the signal transmitting unit 32.

The signal receiving unit 31 includes a radio receiving unit 312 and a received signal composition unit 311. The radio receiving unit 312 receives a signal transmitted from the relay device 1 or the base station 2. Then, the radio receiving unit 312 outputs the signal received from the relay device 1 or the base station 2 to the received signal composition unit 311. The received signal composition unit 311 performs the composition process on the signal that is input from the radio receiving unit 312. Then, the received signal composition unit 311 transmits the composition signal to the control unit 301. For example, if the radio receiving unit 312 receives a transmission instruction signal containing code number 5 from the base station 2, the received signal composition unit 311 performs the composition process on the transmission instruction signal containing the designated code number 5 and outputs the signal to the control unit 301.

The control unit 301 receives, from the received signal composition unit 311, an input of the transmission instruction signal containing the designated code number 5. Then, the control unit 301 controls a transmission signal creating unit 323 such that it creates a synchronization signal containing code number 5.

The signal transmitting unit 32 includes the transmission signal creating unit 323 and a radio transmitting unit 324. The transmission signal creating unit 323 includes the creating unit 321. The radio transmitting unit 324 includes the radio signal transmitting unit 322.

Under the control of the control unit 301, the transmission signal creating unit 323 creates a transmission signal. For example, the transmission signal creating unit 323 is controlled by the control unit 301 so that it creates a control signal containing code number 5. Then, the creating unit 321 creates a synchronization signal containing code number 5. The transmission signal creating unit 323 outputs, to the radio transmitting unit 324, the created synchronization signal containing code number 5.

The radio transmitting unit 324 transmits, to the base station 2, the transmission signal that is input from the transmission signal creating unit 323. For example, the radio transmitting unit 324 receives, from the transmission signal creating unit 323, an input of the synchronization signal. Then, the radio signal transmitting unit 322 in the radio transmitting unit 324 transmits the synchronization signal to the base station 2.

Figure 7:
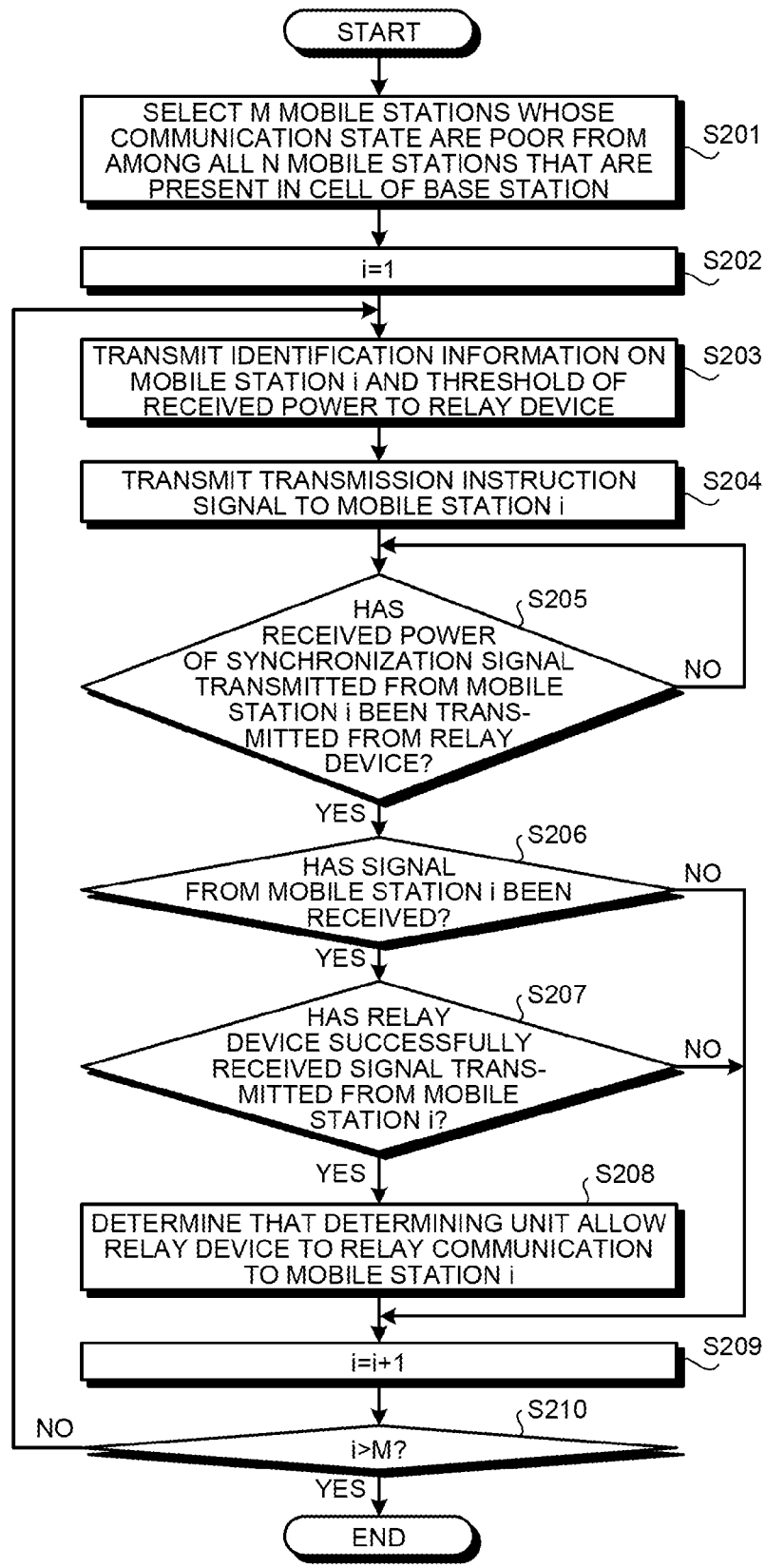
FIG. 7 is a flowchart illustrating the flow of the operation of the base station performed in a relay device determination process.

In the following, the operation of the base station when it performs the relay device determination process will be described with reference to FIG. 7. FIG. 7 is a flowchart illustrating the flow of the operation of the base station performed during a relay device determination process. In the following explanation, if there are multiple mobile stations whose communication states are poor, it is sequentially determined whether the relay device 1 performs a relay for each mobile station. However, in practice, the relay device determination process may also be simultaneously performed on the multiple mobile stations. Furthermore, in this example, a relay device other than the relay device 1 is not taken into consideration. If the relay device 1 transmits the received power and if the relay device 1 successfully receives a signal from a mobile station, the relay device 1 is allowed to relay the communication to a mobile terminal.

The mobile station selecting unit 24 selects a mobile station whose communication state is poor from among mobile stations that are present in the cell of the base station 2. In this example, a description will be given of a case in which M mobile stations are present whose communication states are poor. Specifically, the mobile station selecting unit 24 selects M mobile stations (Step S201).

The signal transmitting unit 21 resets its own counter and sets it to i=1 (Step S202).

The specific information transmitting unit 211 transmits, to the relay device 1, identification information on the mobile station i. The signal transmitting unit 21 transmits the threshold of the received power to the relay device 1 (Step S203).

The control signal transmitting unit 212 transmits a transmission instruction signal to the mobile station i (Step S204).

The signal receiving unit 22 determines whether the received power of the synchronization signal from the mobile station i is transmitted from the relay device 1 (Step S205). If the received power of the synchronization signal from the mobile station i has not been transmitted (No at Step S205), the signal receiving unit 22 waits until the received power of the synchronization signal from the mobile station i is transmitted from the relay device 1.

In contrast, if the received power of the synchronization signal from the mobile station i has been transmitted (Yes at Step S205), the signal receiving unit 22 determines whether it has received the synchronization signal transmitted from the mobile station i (Step S206). If the signal receiving unit 22 has not received the synchronization signal transmitted from the mobile station i (No at Step S206), the signal receiving unit 22 ends the relay device determination process performed with the mobile station i and proceeds to Step S209.

In contrast, if the signal receiving unit 22 has received the synchronization signal transmitted from the mobile station i (Yes at Step S206), the determining unit 23 determines whether the relay device 1 has successfully received a signal transmitted from the mobile station i (Step S207). Specifically, the determining unit 23 acquires, from the signal received from the relay device 1, identification information on the transmission source of the synchronization signal whose received power is measured. Then, if the identification information on the transmission source of the synchronization signal matches the identification information on the mobile station i, the determining unit 23 determines that the relay device 1 has successfully received the signal transmitted from the mobile station i. If the relay device 1 fails to receive the signal transmitted form the mobile station i (No at Step S207), the determining unit 23 ends the relay device determination process performed with the mobile station i and proceeds to Step S209.

In contrast, if the relay device 1 has successfully received the signal from the mobile station i (Yes at Step S207), the determining unit 23 determines that it allows the relay device 1 to relay the communication to the mobile station i (Step S208).

The signal transmitting unit 21 increments its own counter, i.e., i=i+1 (Step S209).

Then, the signal transmitting unit 21 determines whether i is equal to or greater than M (Step S210). If i is less than M (No at Step S210), the signal transmitting unit 21 returns to Step S203 and performs a process for determining a relay device with respect to a mobile station. In contrast, if is equal to or greater than M (Yes at Step S210), the base station 2 ends the relay device determination process.

Figure 8:
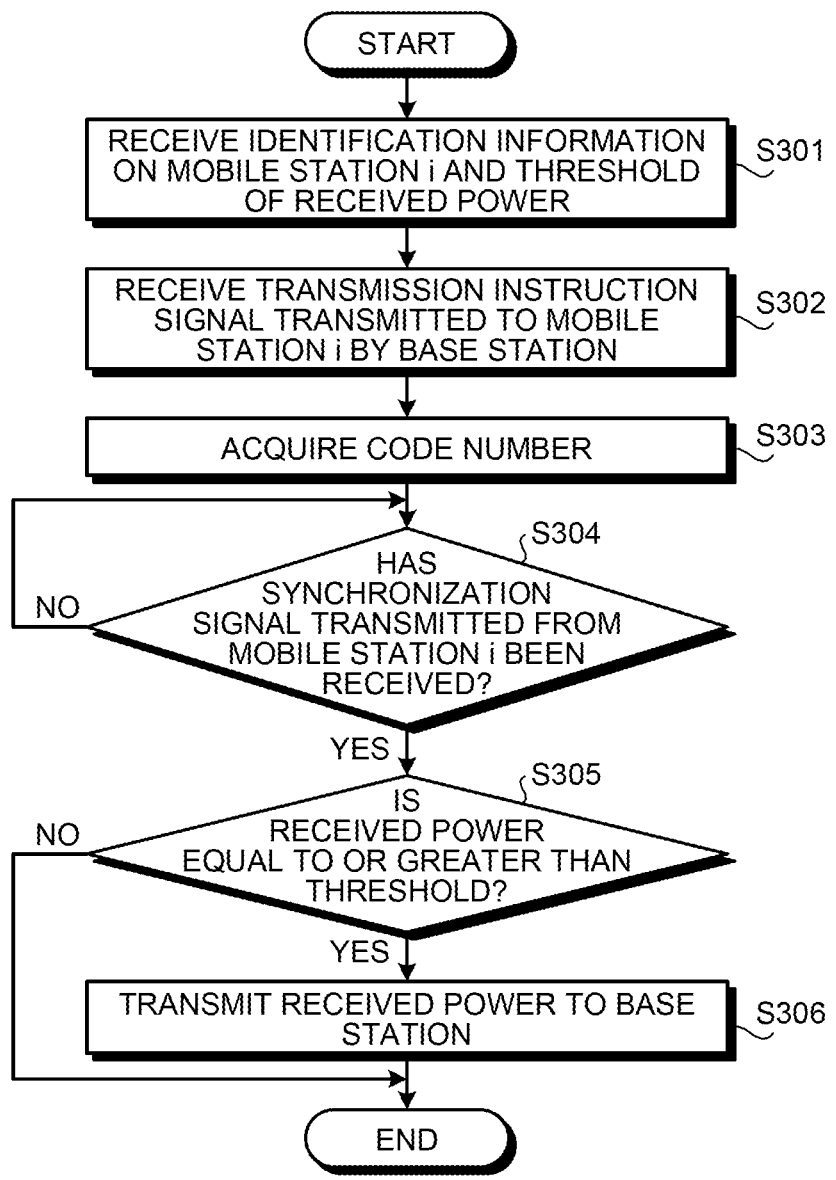
FIG. 8 is a flowchart illustrating the flow of the operation of the relay device performed in the relay device determination process.

In the following, the operation of the relay device 1 when it performs the relay device determination process will be described with reference to FIG. 8. FIG. 8 is a flowchart illustrating the flow of the operation of the relay device performed in the relay device determination process.

The information receiving unit 11 receives, from the specific information transmitting unit 211, the identification information on the mobile station i, and the threshold receiving unit 15 receives, from the signal transmitting unit 21, the threshold of the received power (Step S301).

The control signal receiving unit 121 confirms whether the signal transmitted by the base station 2 contains the identification information on the mobile station 3. If the signal is transmitted to the mobile station i, the signal is received as a transmission instruction signal that is transmitted to the mobile station i (Step S302).

The type acquiring unit 122 acquires a code number that is designated by the transmission instruction signal received by the control signal receiving unit 121 (Step S303).

The signal receiving unit 123 determines whether it receives the synchronization signal transmitted from the mobile station i (Step S304). If the signal receiving unit 123 has not received the synchronization signal transmitted from the mobile station i (No at Step S304), the signal receiving unit 123 waits until it receives the synchronization signal transmitted from the mobile station i.

In contrast, if the signal receiving unit 123 has received the synchronization signal transmitted from the mobile station i (Yes at Step S304), the measuring unit 13 measures the received power of the synchronization signal transmitted from the mobile station i. Then, the quality transmitting unit 14 determines whether the received power measured by the measuring unit 13 is equal to or greater than the threshold (Step S305). If the received power measured by the measuring unit 13 is less than the threshold (No at Step S305), the relay device 1 ends the relay device determination process.

In contrast, if the received power measured by the measuring unit 13 is equal to or greater than the threshold (Yes at Step S305), the quality transmitting unit 14 transmits the received power to the base station 2 (Step S306).

As described above, the relay device according to the second embodiment can receive, on the basis of the identification information that is input from the base station, the transmission instruction signal that is transmitted from a base station to a predetermined mobile station. Furthermore, the relay device can specify a synchronization signal containing a code number designated by the transmission instruction signal. Accordingly, when the base station instructs the mobile station to transmit the synchronization signal containing a predetermined code number, the relay device can actively acquire the received power of the synchronization signal containing the predetermined code number that is transmitted from the predetermined mobile station and transmit it to the base station. Then, the base station does not need to, in order to establish communication with a predetermined mobile station, check with the predetermined mobile station whether the reception quality that is transmitted from the relay device is the reception quality of the synchronization signal from the predetermined mobile station. Accordingly, it is possible to reduce the time taken to establish the communication between the base station and the mobile station via the relay device. Furthermore, because the relay device processes only the synchronization signal transmitted from a predetermined mobile station, the load can be reduced, thus reducing the electrical power consumption. Furthermore, because the relay device processes only the synchronization signal transmitted from a predetermined mobile station, it is possible to reduce the amount of signals transmitted from the relay device to the base station, thus reducing the interference between signals.

[c] Third Embodiment

Figure 9:
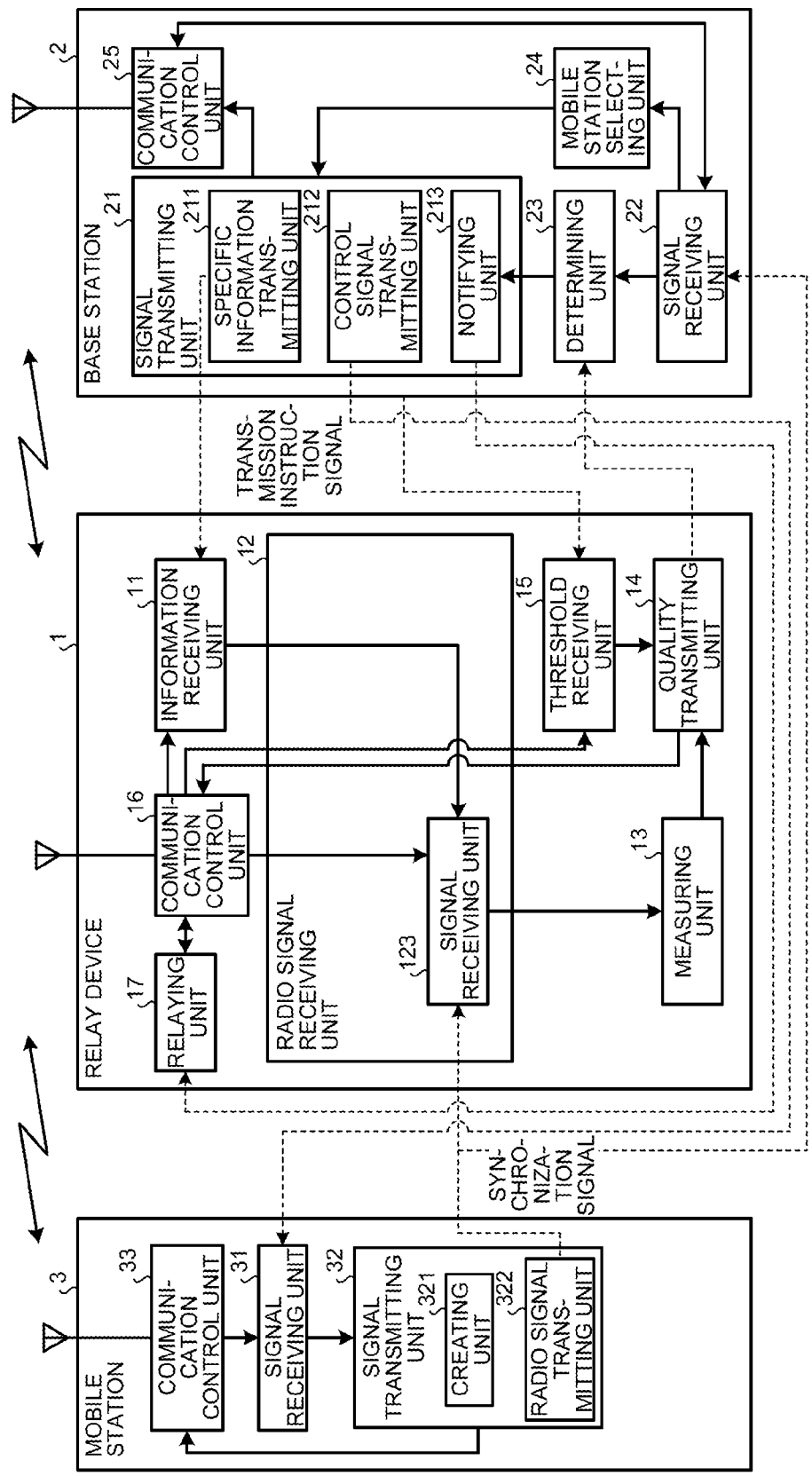
FIG. 9 is a block diagram illustrating a radio communication system according to a modification.

The radio communication system according to the third embodiment differs from the second embodiment in that a base station previously notifies a relay device of a data type designated by the transmission instruction signal. FIG. 9 is a block diagram illustrating a radio communication system according to a modification. As illustrated in FIG. 9, the relay device 1 according to the second embodiment has a configuration in which the control signal receiving unit 121 and the type acquiring unit 122 are excluded from the relay device 1 according to the second embodiment illustrated in FIG. 2. In the third embodiment, units illustrated in FIG. 9 having the same reference numerals as those illustrated in FIG. 2 have the same function as that described in the second embodiment unless otherwise noted.

The information receiving unit 11 receives, from the specific information transmitting unit 211, the data type designated by the transmission instruction signal that is transmitted by the base station 2 to the mobile station 3. Then, the information receiving unit 11 outputs, to the signal receiving unit 123, a code number designated by the transmission instruction signal that is transmitted by the base station 2 to the mobile station 3.

The signal receiving unit 123 receives, from the information receiving unit 11, an input of the code number designated by the transmission instruction signal that is transmitted by the base station 2 to the mobile station 3. Then, the signal receiving unit 123 creates a replica of the designated code number and multiplies the created replica by a signal transmitted from each mobile station that is present in the cell of the base station 2, thereby specifying the synchronization signal from the mobile station 3. Then, the signal receiving unit 123 receives the synchronization signal transmitted from the mobile station 3.

Figure 10:
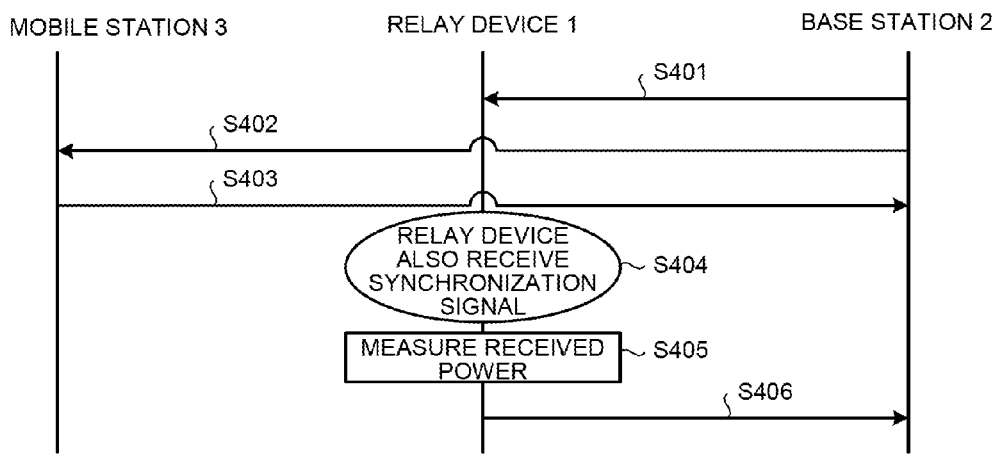
FIG. 10 is a sequence diagram illustrating a relay device determination process performed by a radio communication system according to the third embodiment.
Figure 11:
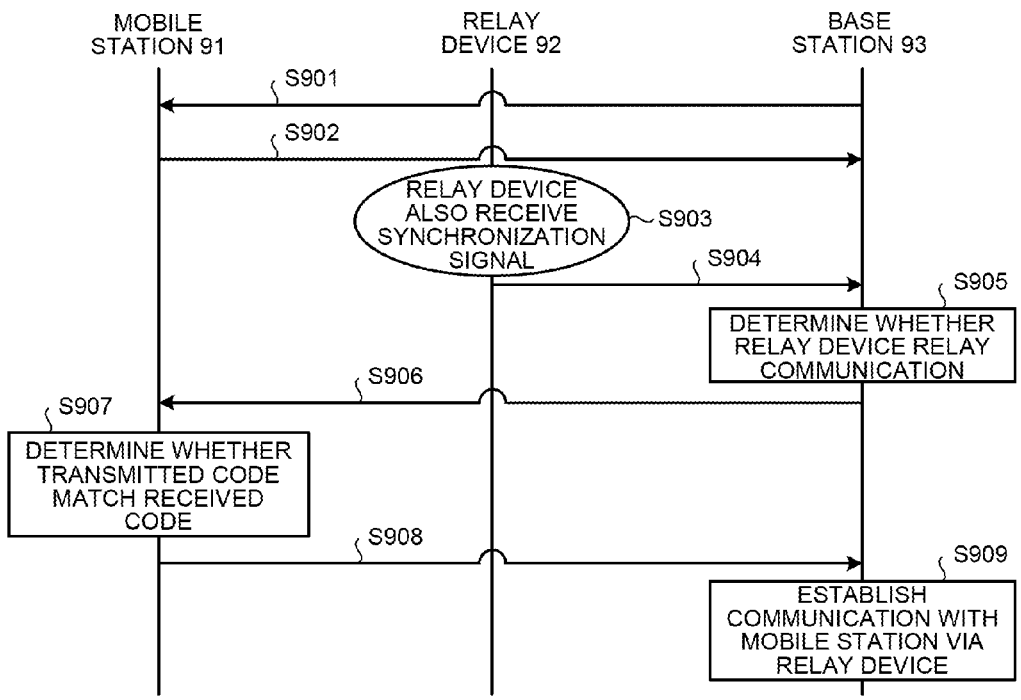
FIG. 11 is a sequence diagram illustrating a process for establishing communication between a mobile station and a base station via a relay device by using a conventional technology.

In the following, the flow of the relay device determination process performed in the radio communication system according to the third embodiment will be described with reference to FIG. 10. FIG. 10 is a sequence diagram illustrating a relay device determination process performed by a radio communication system according to the third embodiment.

The base station 2 transmits, to the relay device 1, the code number designated by the transmission instruction signal with respect to the mobile station 3 and the threshold of the received power (Step S401). In this case, because the relay device 1 receives the data type from the base station 2, the relay device 1 does not need to acquire, from the base station 2, the code number that is designated by the transmission instruction signal transmitted to the mobile station 3. Accordingly, the base station 2 does not notify the relay device 1 of an identification signal of the mobile station 3.

The base station 2 transmits the transmission instruction signal to the mobile station 3 (Step S402). In the third embodiment, the relay device 1 does not receive the transmission instruction signal that is transmitted to the mobile station 3.

The mobile station 3 transmits, to the base station 2, the synchronization signal containing the code number designated by the transmission instruction signal (Step S403).

By using the code number received from the base station 2, the relay device 1 receives the synchronization signal transmitted from the mobile station 3 to the base station (Step S404).

The relay device 1 measures the received power of the synchronization signal transmitted from the mobile station 3 (Step S405).

The relay device 1 transmits, to the base station 2, the received power of the synchronization signal and the identification information of the transmission source contained in the synchronization signal (Step S406).

Accordingly, the base station 2 can acquire the received power, in the relay device 1, of the synchronization signal transmitted by the mobile station 3 and determine whether it allows the relay device 1 to relay the communication to the mobile station 3. If the base station 2 allows the relay device 1 to relay the communication between the base station 2 and the mobile station 3, the base station 2 instructs the relay device 1 to relay the communication to the mobile station 3. The communication between the base station 2 and the mobile station 3 performed thereafter is performed via the relay device 1.

As described above, in the radio communication system according to the third embodiment, the relay device does not need to receive a transmission instruction signal transmitted from a base station to a mobile station and does not need to acquire the data type designated by the transmission instruction signal. Accordingly, the processing load on the relay device can be reduced, thus further reducing the electrical power consumed by the relay device.

[d] Fourth Embodiment

In the following, a radio communication system according to a fourth embodiment will be described. The radio communication system according to the fourth embodiment sequentially transmits a transmission instruction signal to multiple mobile stations at staggered times and sequentially transmits the received power of the synchronization signal transmitted from each mobile station to the base station at staggered times. The configuration in the fourth embodiment can be used in any one of the first, the second, and the third embodiments. In this example, a case in which the radio communication system according to the fourth embodiment is used in the second embodiment will be described with reference to FIG. 2. In the example described below, it is assumed that multiple mobile stations are present in the cell of the base station 2 and it is assumed that the mobile station 3 is also included therein.

The control signal transmitting unit 212 in the base station 2 transmits, to each mobile station selected by the mobile station selecting unit 24, a transmission instruction signal at predetermined time intervals.

The control signal receiving unit 121 receives the transmission instruction signal from the control signal transmitting unit 212 and stores therein the time it is received. Because the control signal transmitting unit 212 sequentially transmits a transmission instruction signal to each mobile station at staggered times, the control signal receiving unit 121 sequentially receives a transmission instruction signal that is transmitted to each mobile station by the control signal transmitting unit 212. Then, the control signal receiving unit 121 outputs, to the type acquiring unit 122, the time at which the transmission instruction signal is received together with the transmission instruction signal. In the following, a description will be given of a case in which the control signal receiving unit 121 receives a transmission instruction signal transmitted to the mobile station 3.

The type acquiring unit 122 acquires the data type designated by the transmission instruction signal. Then, the type acquiring unit 122 outputs, to the signal receiving unit 123, the time at which the control signal receiving unit 121 received the transmission instruction signal transmitted to the mobile station 3 together with the data type.

The signal receiving unit 123 receives, from the mobile station 3, the synchronization signal that is transmitted to the base station 2. Then, the signal receiving unit 123 outputs, to the measuring unit 13, the time at which the control signal receiving unit 121 received the transmission instruction signal transmitted to the mobile station 3 together with the synchronization signal transmitted from the mobile station 3.

The measuring unit 13 measures the received power of the synchronization signal transmitted from the mobile station 3. Then, the measuring unit 13 transmits, to the quality transmitting unit 14, the time at which the control signal receiving unit 121 received the transmission instruction signal transmitted to the mobile station 3 together with the received power of the synchronization signal transmitted from the mobile station 3.

The quality transmitting unit 14 previously stores therein the number of frames used to determine the time at which the received power of the synchronization signal transmitted from the mobile station is transmitted.

The quality transmitting unit 14 determines whether the received power of the synchronization signal transmitted from the mobile station 3 is equal to or greater than a threshold. Then, the quality transmitting unit 14 transmits, to the base station 2, the received power of the synchronization signal transmitted from the mobile station 3 in accordance with a signal that is received when a previously determined number of frames are received after the control signal receiving unit 121 has received the transmission instruction signal transmitted to the mobile station 3. In the fourth embodiment, the time difference is created using the predetermined number of frames; however, any method may be used as long as predetermined time intervals can be created. For example, it may also be possible to use a method in which the received power is reported using a signal that is transmitted after the $n^{th}$ slot. In such a case, the quality transmitting unit 14 does not transmit the identification information on the transmission source of the synchronization signal to the determining unit 23. This is an example in which the received power is sequentially transmitted by the quality transmitting unit 14 at staggered times at a predetermined time after a radio signal has been received.

The determining unit 23 previously stores the time period from when the control signal receiving unit 121 receives the transmission instruction signal until the quality transmitting unit 14 transmits the received power of the synchronization signal (for example, stores the number of frames). If the determining unit 23 receives, from the quality transmitting unit 14, the received power of the synchronization signal, the control signal transmitting unit 212 acquires the identification information on the mobile station, i.e., the destination, from the time at which the transmission instruction signal is transmitted. For example, it is assumed that the determining unit 23 stores therein the time period, from when the control signal receiving unit 121 receives the transmission instruction signal until the quality transmitting unit 14 transmits the received power of the synchronization signal, as n frames. In such a case, when the determining unit 23 receives, from the quality transmitting unit 14, the received power of the synchronization signal transmitted from the mobile station 3, the determining unit 23 searches for a mobile station to which the control signal transmitting unit 212 transmits, after the received power is received but before the time period of n frames, the transmission instruction signal and acquires the identification information on the mobile station 3. Accordingly, the determining unit 23 can specify a mobile station that transmits the received power of the synchronization signal received from the quality transmitting unit 14.

As described above, the radio communication system according to the fourth embodiment does not request to transmit the identification information on the transmission source of the synchronization signal received by the relay device 1. Accordingly, it is possible to reduce the amount of information transmitted from the relay device 1, thus reducing the load on the radio communication.

According to an aspect of the relay device, the relay device control method, and the radio communication system disclosed in the present invention, it is possible to reduce the time taken to establish the communication between a base station and a mobile station via a relay device that is not recognized by the mobile station. Furthermore, according to an aspect of the relay device, the relay device control method, and the radio communication system disclosed in the present invention, an advantage is provided in that it is possible to reduce the electrical power consumed, by each device, for establishing communication.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay device comprising:
an information receiving unit that receives specific information for specifying a radio signal that uses a predetermined type of data transmitted by a predetermined mobile station;
a radio signal receiving unit that receives, on the basis of the specific information, the radio signal that uses the predetermined type of the data transmitted by the predetermined mobile station;
a measuring unit that measures reception quality of the radio signal that is received by the radio signal receiving unit; and
a quality transmitting unit that transmits the reception quality of the radio signal measured by the measuring unit.

2. The relay device according to claim 1, wherein
the information receiving unit receives identification information, as the specific information, on the predetermined mobile station, and
the radio signal receiving unit includes
a control signal receiving unit that receives, on the basis of the identification information, a control signal that contains a data type, which is designated, of the predetermined type of data and that instructs a radio signal to be transmitted to the predetermined mobile station,
a type acquiring unit that acquires the data type designated by the control signal, and
a signal receiving unit that receives the radio signal that is transmitted by the predetermined mobile station and that uses the data type acquired by the type acquiring unit.

3. The relay device according to claim 1, wherein
the information receiving unit receives a data type as the specific information, and
the radio signal receiving unit receives a radio signal that is transmitted by the predetermined mobile station and that uses the data type, which is received by the information receiving unit, of the predetermined type of data.

4. The relay device according to claim 1, further comprising a threshold receiving unit that receives a threshold of reception quality, wherein,
when the reception quality of the radio signal measured by the measuring unit is equal to or greater than the threshold, the quality transmitting unit transmits the reception quality of the radio signal.

5. The relay device according to claim 1, wherein the information receiving unit transmits the reception quality a predetermined time after the radio signal receiving unit has received the radio signal.

6. The relay device according to claim 1, wherein the quality transmitting unit transmits the identification information together with the reception quality.

7. A relay device control method comprising:
receiving specific information for specifying a radio signal that uses a predetermined type of data transmitted by a predetermined mobile station;
receiving, on the basis of the specific information, a radio signal that uses the predetermined type of the data transmitted by the predetermined mobile station;
measuring reception quality of the radio signal; and
transmitting the measured reception quality of the radio signal.

8. A radio communication system comprising:
a base station; and
a relay device, wherein
the base station includes
a specific information transmitting unit that transmits, to the relay device, specific information for specifying a radio signal that uses a predetermined type of data transmitted by a predetermined mobile station,
a control signal transmitting unit that transmits, to the predetermined mobile station, a control signal that instructs a radio signal that uses a data type of the predetermined type of data to be transmitted,
a quality receiving unit that receives, from the relay device, reception quality of the radio signal received by the relay device,
a determining unit that determines, on the basis of the reception quality of the radio signal received by the relay device, whether the determining unit allows the relay device to relay communication to the predetermined mobile station, and
a notifying unit that notifies the relay device of an instruction to relay communication to the predetermined mobile station, and
the relay device includes
an information receiving unit that receives the specific information,
a radio signal receiving unit that receives, on the basis of the specific information, the radio signal that uses the predetermined type of the data transmitted by the predetermined mobile station,
a measuring unit that measures reception quality of the radio signal received by the radio signal receiving unit,
a quality transmitting unit that transmits the reception quality of the radio signal measured by the measuring unit, and
a relaying unit that relays, in response to the instruction to relay communication received from the relay device, communication between the relay device and the predetermined mobile station.

9. A radio communication system comprising:
a base station;
a relay device; and
a mobile station, wherein
the base station includes
a specific information transmitting unit that transmits, to the relay device, specific information for specifying a radio signal that uses a predetermined type of data transmitted by the mobile station,
a control signal transmitting unit that transmits, to the mobile station, a control signal that instructs a radio signal that uses a data type of the predetermined type of data to be transmitted,
a quality receiving unit that receives, from the relay device, reception quality of the radio signal received by the relay device,
a determining unit that determines, on the basis of the reception quality of the radio signal received by the relay device, whether the determining unit allows the relay device to relay communication to the mobile station, and
a notifying unit that notifies the relay device of an instruction to relay communication to the mobile station, and
the mobile station includes
a creating unit that receives the control signal from the base station and creates a radio signal that uses the data type designated by the control signal, and
a radio signal transmitting unit that transmits, to the base station, the radio signal created by the creating unit, and
the relay device includes
an information receiving unit that receives the specific information,
a radio signal receiving unit that receives, on the basis of the specific information, the radio signal that uses the predetermined type of the data transmitted by the mobile station,
a measuring unit that measures reception quality of the radio signal received by the radio signal receiving unit,
a quality transmitting unit that transmits, to the relay device, the reception quality of the radio signal measured by the measuring unit, and
a relaying unit that relays, in response to the instruction to relay communication received from the base station, communication between the relay device and the mobile station.

* * * * *